(12) United States Patent
Beres et al.

(10) Patent No.: US 11,785,332 B2
(45) Date of Patent: *Oct. 10, 2023

(54) PRODUCTION SHOT DESIGN SYSTEM

(71) Applicant: Home Box Office, Inc., New York, NY (US)

(72) Inventors: Stephen Beres, Valencia, CA (US); Uwe Kranich, Aschheim (DE)

(73) Assignee: HOME BOX OFFICE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/582,936

(22) Filed: Jan. 24, 2022

(65) Prior Publication Data

US 2022/0150419 A1    May 12, 2022

Related U.S. Application Data

(63) Continuation of application No. 16/705,486, filed on Dec. 6, 2019, now Pat. No. 11,252,333.

(60) Provisional application No. 62/783,635, filed on Dec. 21, 2018.

(51) Int. Cl.
*H04N 23/63*    (2023.01)
*G11B 27/031*    (2006.01)
(Continued)

(52) U.S. Cl.
CPC ......... *H04N 23/632* (2023.01); *G11B 27/031* (2013.01); *H04N 5/2621* (2013.01);
(Continued)

(58) Field of Classification Search
CPC .... H04N 23/632; H04N 23/633; H04N 23/66; H04N 23/662; H04N 23/60; H04N 23/69;
(Continued)

(56) References Cited

U.S. PATENT DOCUMENTS 8,253,728 B1* 8/2012 Sullivan .................. G06T 19/00
                                                    345/475
11,252,333 B2* 2/2022 Beres ..................... H04N 23/60
(Continued)

OTHER PUBLICATIONS

International Search Report and Written Opinion for International Application No. PCT/US2019/068164 dated Mar. 20, 2020, 12 pages.

(Continued)

*Primary Examiner* — Kelly L Jerabek
(74) *Attorney, Agent, or Firm* — Amin, Turocy & Watson, LLP

(57) ABSTRACT

The described technology is directed towards a production shot design system that facilitates previsualizing scene shots, including by members of a production crew (running client devices) in different locations in a collaborative and secure shot construction environment. Modifiable scene elements' properties and camera data can be manipulated to build a scene (shot) containing modifiable and non-modifiable scene elements. In an online, shared camera mode, changes to a scene can be communicated to other client devices, e.g., virtually immediately, so that each client device displays the change for other users to see at an interactive frame rate. Scene changes can also be made locally and/or in an offline mode before communicating to other users. In various aspects, animation and a video plane camera/video plane (e.g., greenscreen) are integrated into the production shot design system.

20 Claims, 19 Drawing Sheets

(51) Int. Cl.
  *H04N 5/262* (2006.01)
  *H04N 23/66* (2023.01)
  *H04N 23/661* (2023.01)

(52) U.S. Cl.
  CPC ......... *H04N 5/2628* (2013.01); *H04N 23/633* (2023.01); *H04N 23/66* (2023.01); *H04N 23/662* (2023.01)

(58) Field of Classification Search
  CPC .. H04N 23/695; H04N 5/2621; H04N 5/2628; G11B 27/031
  See application file for complete search history.

(56) References Cited

U.S. PATENT DOCUMENTS

| | | | | |
|---|---|---|---|---|
| 2012/0233555 A1* | 9/2012 | Psistakis | ............. | G11B 27/034 715/751 |
| 2014/0229865 A1* | 8/2014 | Da Costa | ............ | G06F 3/04815 715/757 |
| 2015/0261403 A1* | 9/2015 | Greenberg | ............... | H04N 7/16 715/716 |
| 2015/0379358 A1* | 12/2015 | Renkis | ................... | H04N 7/181 348/159 |
| 2016/0156874 A1* | 6/2016 | Rajagopalan | ......... | H04L 67/104 348/207.1 |
| 2019/0355181 A1* | 11/2019 | Srinivasan | .......... | G06F 3/04842 |

OTHER PUBLICATIONS

International Preliminary Report on Patentability for International Application No. PCT/US2019/068164 dated Jul. 1, 2021, 10 pages.
Office Action dated Jun. 15, 2021 for U.S. Appl. No. 16/705,486, 31 pages.
Notice of Allowance dated Oct. 5, 2021 for U.S. Appl. No. 16/705,486, 24 pages.

* cited by examiner

PRODUCTION SHOT DESIGN SYSTEM

CROSS-REFERENCE TO RELATED APPLICATIONS

This application is a continuation of pending U.S. patent application Ser. No. 16/705,486, filed on Dec. 6, 2019 entitled "PRODUCTION SHOT DESIGN SYSTEM," which claims priority to U.S. Provisional Patent Application No. 62/783,635, filed on Dec. 21, 2018 entitled "PRODUCTION SHOT DESIGN SYSTEM." The entireties of the aforementioned applications are hereby incorporated herein by reference.

COPYRIGHT DISCLAIMER

A portion of the disclosure of this patent document, which may include copyrighted images, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

During the planning stages of a production, such as a movie, television show, documentary, etc., there is often a need for different departments or the like within the production crew to work together in developing the look of and placement of characters, scenic elements, camera(s) and more within a scene. Different members of the production crew are often not located in the same city or even country; therefore their ability to collaborate is greatly limited by their physical location.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein described herein are generally directed towards a production shot design system (sometimes referred to as "ShotMaker") for straightforward and efficient shot design by users, e.g. members of a production crew. This can include remote users, such as a worldwide team of users. The production shot design system allows the members of a production crew to work together to build shots, without having to be in the same location. The technology offers users the ability to interact with one another over the Internet (or other remote connection), in a collaborative and secure shot construction environment.

In one or more implementations, the design of the production shot design system allows almost anyone to use the system in a straightforward manner. This opens up the possibility of previsualizing scenes very early on in the planning process, which can be well before a traditional previsualization team would start. Work done within the production shot design can be used as the base for a previsualization artist or team to quickly create animations and/or as a foundation to initial previsualization work.

The placement of scenic elements, such as buildings, vehicles and props, as well as character models and camera positions, can be done in a straightforward manner. In addition to placement, the system facilitates changing the properties of these elements, such as (but not limited to) any property's material(s), color(s), shape(s), camera parameters, lights, etc. in a very straightforward manner. In addition, scene elements and their properties can be added or deleted. Because actions performed by a user can be (virtually immediately) shared among the other users, feedback can be given in real time or near real time.

Figure 1:
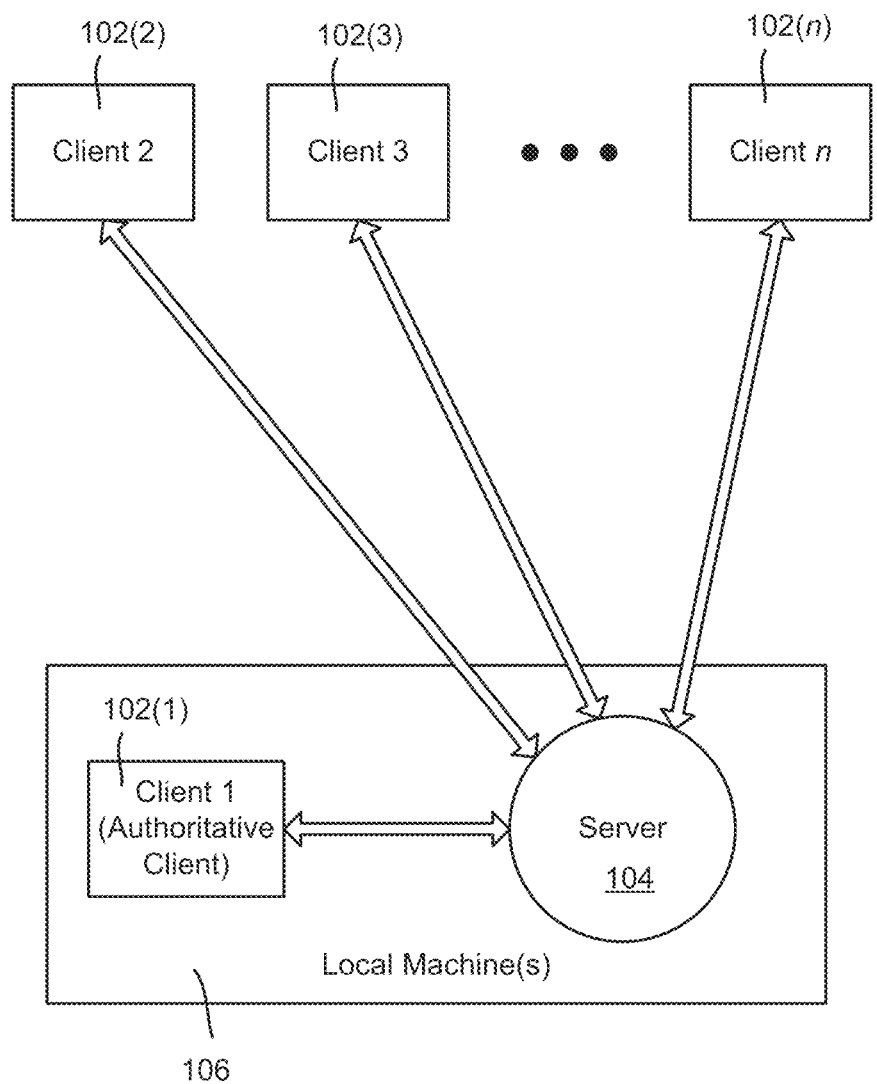
FIGS. 1-4 are block diagram representations of various example implementations comprising client devices coupled to a server device to facilitate a production shot design system, in accordance with various aspects and example implementations of the subject disclosure.

Turning to one example system architecture, as represented in FIG. 1, in one or more implementations, the production shot design system comprises multiple clients 102(1)-102(n) (e.g., including client devices, any practical number is feasible) and a server 104. The clients 102(1)-102(n), via client application instances (e.g., client application instance 550 FIG. 5) perform the display operations and facilitate the user interaction. The clients 102(1)-102(n), communicate with each other through the server 104, although it is feasible to use a peer-to-peer or other (e.g., client hierarchy) communication model. In the example of FIG. 1, an authoritative client 102(1), as described herein, runs on a local machine 106 with respect to the server 104. The local machine 106 can be a single local machine, a machine configured to run any number of virtual machines, two or more machines coupled over a local connection, and so forth.

Figure 2:
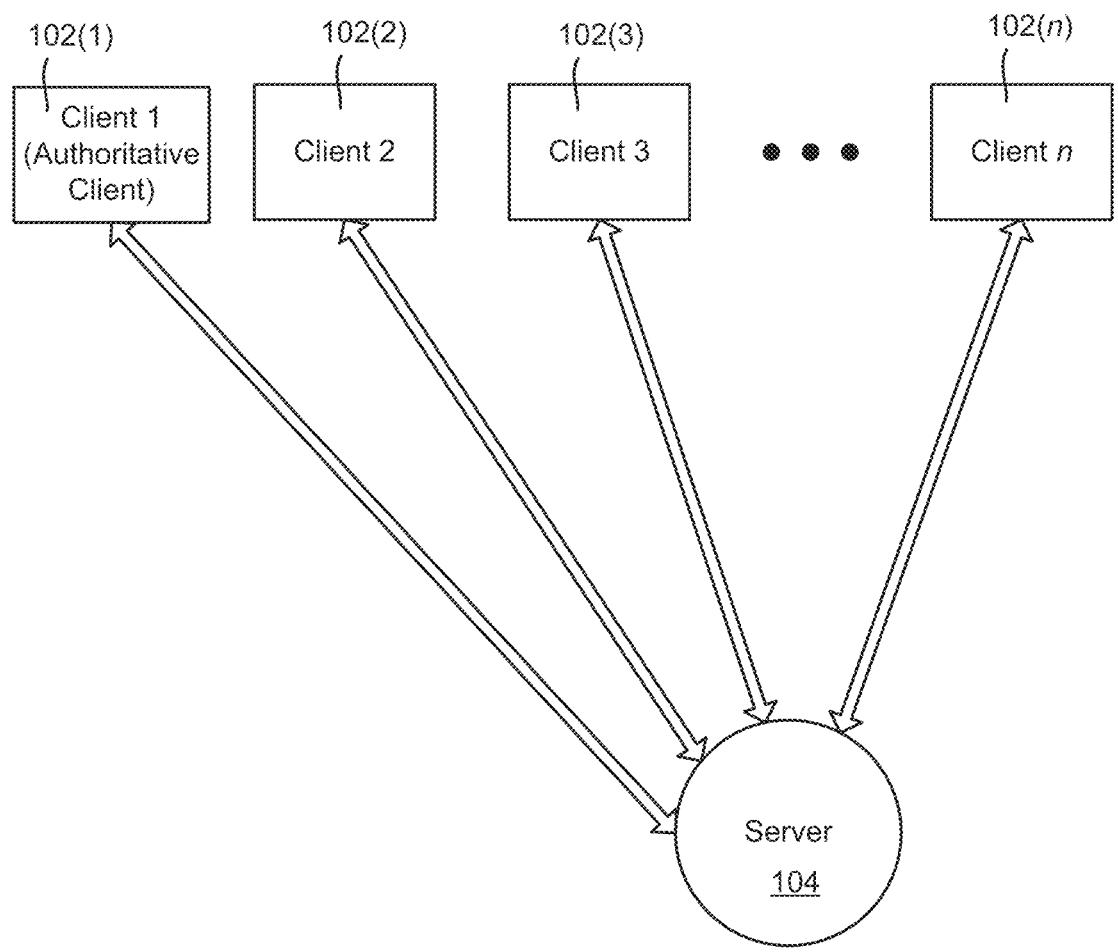

In one or more implementations, the server 104 comprises a central entity for the communication. Client-to-client communication goes through the server. Note that as in FIGS. 1 and 3, the server 104 can run (e.g., as an application or server instance) on the local machine 106, which can also run a client application instance. If a client runs on a local machine with the server 104, in one or more implementations this particular client is the authoritative client 102(1), as described herein. Notwithstanding, an authoritative client 102(1) can be run on a local machine that does not include the server, as in FIGS. 2 and 4.

Figure 3:
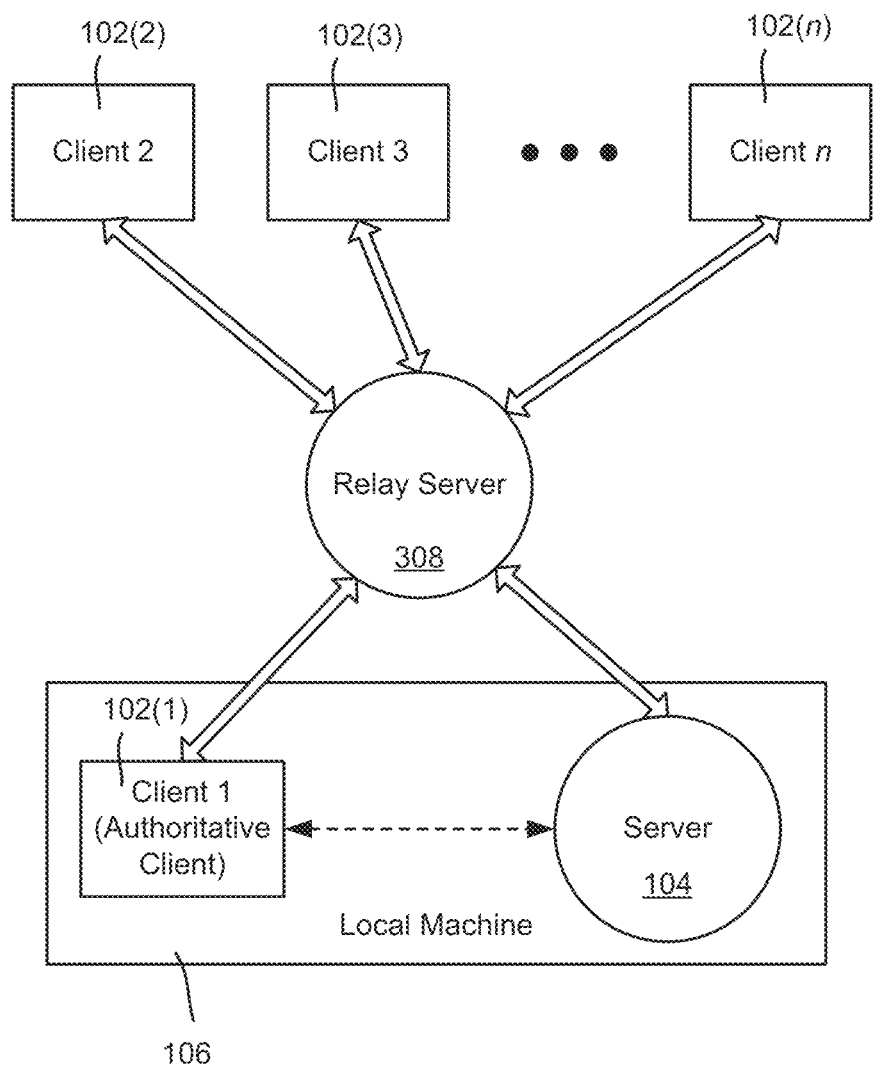
Figure 4:
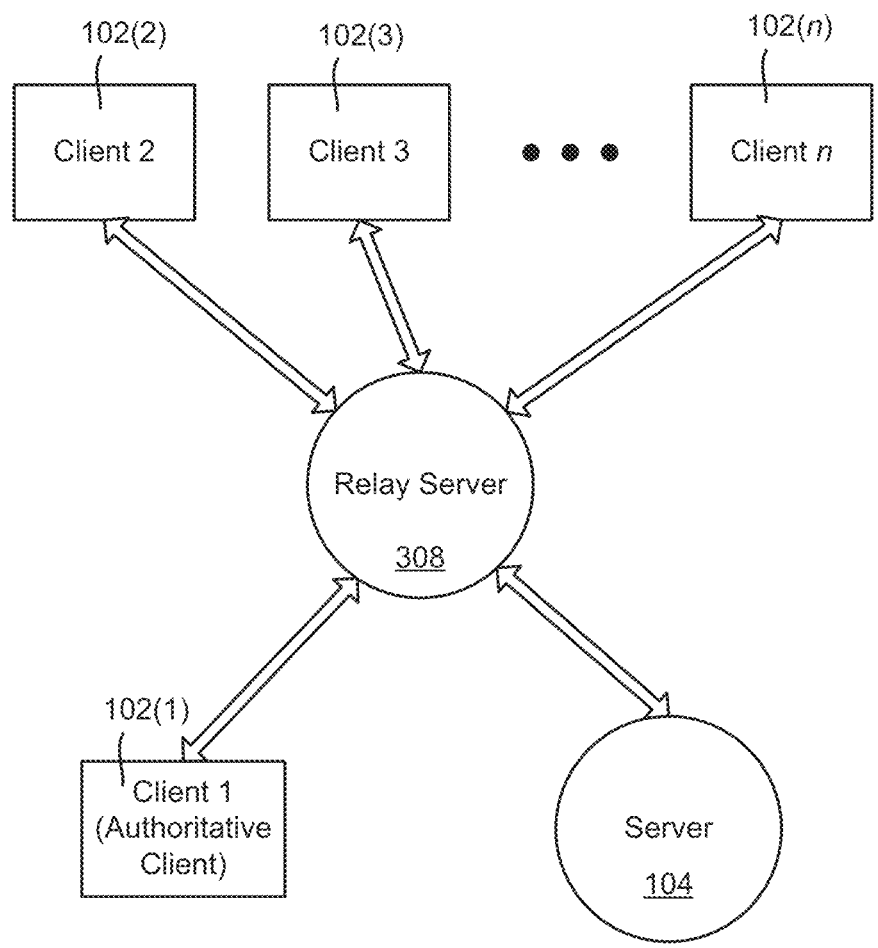

As shown in FIGS. 3 and 4, the various clients 102(1)-102(n) and the server 104 optionally can communicate through a relay server 308; (more than one relay server may be present). The use of a relay server 308 allows building the network worldwide, without any significant dedicated resources from the user side. Logically the relay server 308 operates between the server 104 and the clients 102(1)-102(n), although in the local machine 206 example of FIG. 3, the server 104 and the client 102(1) can have at least some intra-machine communications (as represented by the dashed line between the two entities). In one or more implementations, once an application program on a client device has been configured to use the relay server 308, the communication works as if a local network is used. Therefore, following some initial setup, no change in the client code and server code is needed.

With respect to the authoritative client 102(1) (FIGS. 1-4), in one or more implementations, there is one entity in the system that is defined to hold the ground truth scene state, namely the authoritative client 102(1). Note that maintaining this ground truth scene state could be done on the server 104, however that would mean that the scene state also exists on the server, which would be an unnecessary duplication and additional code to mirror at that state. Notwithstanding, having the server 104 maintain this ground truth scene state is a feasible alternative. It is also feasible to have a local machine 106 (FIGS. 1 and 3) or the like maintain the ground truth scene state in a way that provides the server and the authoritative client 102(1) with shared access.

Thus, in one or more implementations, one client is defined to hold the authoritative state, defined as the authoritative client 102(1). Note that in one or more implementations, the authoritative client 102(1) also starts the server 104.

Figure 5:
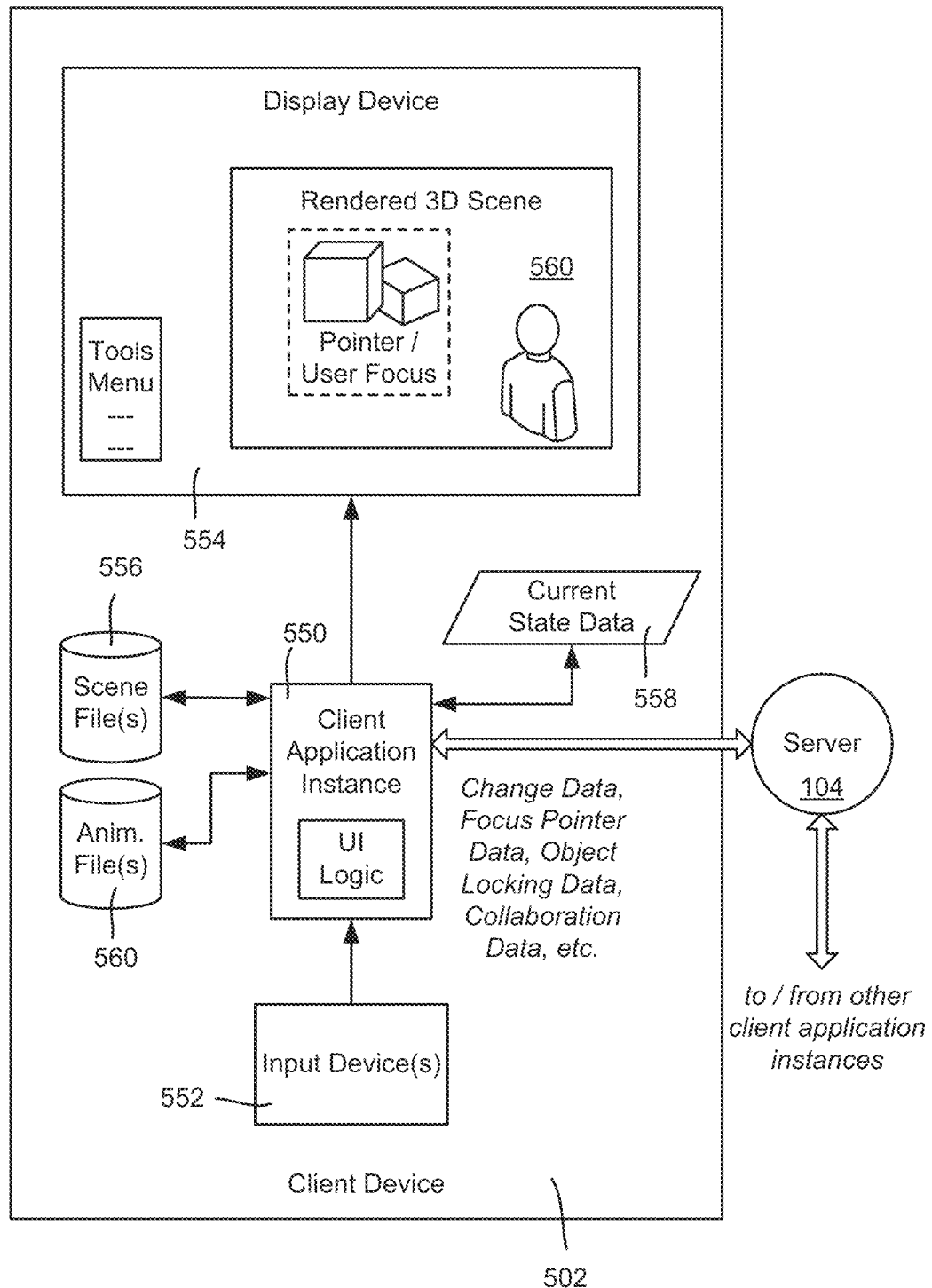
FIG. 5 is an example block diagram representation of components of a client device useable in a production shot design system, in accordance with various aspects and example implementations of the subject disclosure.

As shown in FIG. 5, a client device 502 via a client application instance 550 performs the display operations and facilitates the user interaction (e.g., via UI logic). Note that FIG. 5 is only one example architecture of components of a client device 502, and that other architectures can be used. The client application instance 550 performs a number of operations, comprising facilitating rendering and user interface (UI)/user interaction, and providing an editor. The client application instance 550 can run in the background, e.g., while other device applications are also running. Moreover, user installation of the client application instance 550 is not needed in one or more implementations, e.g., the client application can already be preconfigured on a device by a process, administrator, or the like.

As represented in FIG. 5, input device(s) 552 couple to provide interactive input to the client application instance 550 can include any number of components. Non-limiting example of such components can comprise as a keyboard, mouse or other pointing device, touchscreen (coupled to a display device 554), microphone with voice controller, controller with buttons, joystick and/or cursor pad, including a first person shooter type interactive device as described herein, gesture detector, eye gaze tracker and so on.

The display device 554 can comprise any monitor, projector, goggles, heads-up display, and so on that can output information from the client application instance 550. Other ways to output information are not explicitly shown in FIG. 5, but may be present, and can comprise any audio output device, tactile output device and so on.

One or more scene files can be maintained on the client device 502; in a typical scenario, only one scene file 556, corresponding to a scene (e.g., corresponding to a set of frames) is active at a given time with respect to one running client application instance. A user can operate the client application instance 550 in an offline mode by accessing the scene file 556, such as to experiment with possible scene changes by modifying current state data 558 without such changes being viewed by other client users. The scene file 556 can persist such changes, without them being committed to a ground truth state, e.g., in the offline mode or when in the online mode (unless the authoritative client decides to commit the changes). Animation data/files 560 can also be persisted in a suitable file format, as described herein.

In an online mode, for any client device, the client application instance 550 accesses a scene file's data, which along with current state data 558 including information sent to and obtained from the server 104, allows scene changes to be viewed by others. The current state data 558 can, for example, contain information related to editing, locking or unlocking an object (e.g., representing a scene element), collaboration information and so forth. Note that for a given client device 502, the scene file 556 can be updated by the corresponding client application instance 550, however as described herein, other than updates by the authoritative client 102(1), any non-authoritative client updates are not committed to a ground truth state.

Thus, in one or more implementations, the production shot design system can operate in offline mode. Operation in the online mode is similar to the offline mode, however, the online mode is based upon locking objects before modification.

Figure 6:
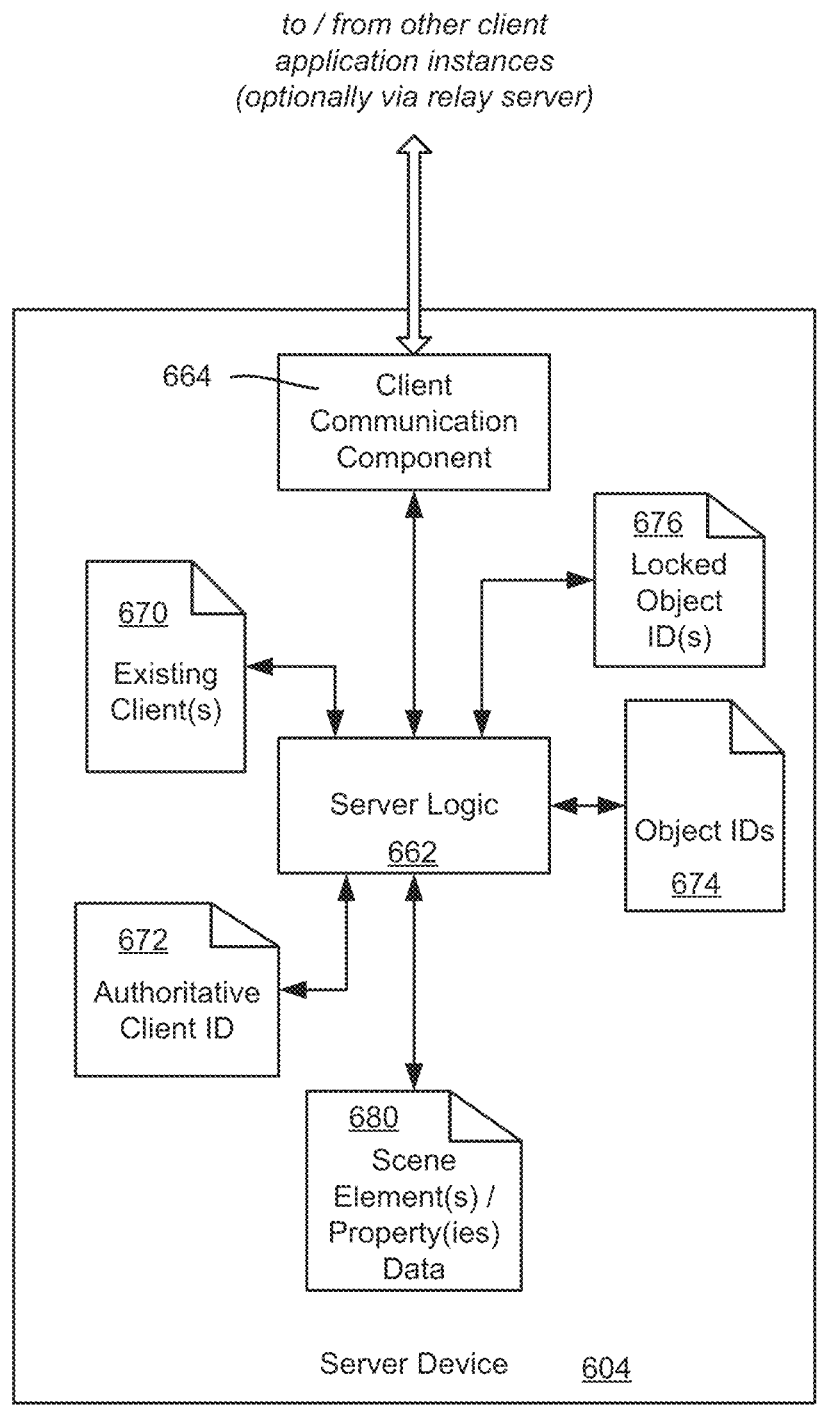
FIG. 6 is an example block diagram representation of components of a server device useable in a production shot design system, in accordance with various aspects and example implementations of the subject disclosure.

In one or more implementations, the server 104, exemplified in FIG. 6 as server logic 662 running on a server device 604, performs a number of operations, including, but not limited to, handling client communication as represented via block 664. For clients 102(1)-102(n), the server logic maintains a data structure(s) that keeps track of existing clients, (e.g., a list of client identifiers), and maintains an identifier 672 of the authoritative client, (which can be a flag or the like in the list of existing clients that designates one of the client identifiers as representing the authoritative client).

For objects, a data structure of object identifiers 674 is maintained, e.g., universal identifiers (object UIDs), along with a system for keeping track of locked objects (block 676). For example, a flag or the like associated with each object identifier can be used to denote whether a given object is currently locked or unlocked. Note that object state data representing that object's variable properties (e.g., type, material(s), color(s), shape, camera parameters, lights, etc.) can be maintained within each object's internal data, and is thus maintained on the clients in one or more implementations. An alternative is to maintain a data structure associated with each object on the server, although as set forth herein it can be advantageous to not have the object data on the server. In addition, information regarding scene elements and their properties can be added or deleted via suitable data structure(s) 680, such as to relate objects to one another.

In operation, each client has a copy of a 3D scene, such as represented in in the simplified rendered 3D scene of FIG. 5 and the example screen representations of FIGS. 7-10. Changes to the scene can be made by any client, such as by interactive tools; (although in alternative implementations, it is feasible to have a "read-only" type client, such as for an observer user that can only provide feedback, or for instructional purposes). For example, via user input as represented in FIG. 5, a user can use an interaction tool to change the pointer focus. Note that camera focus, as well as other camera properties and parameters, corresponding to the simulated (or real) camera, (and which is distinct from user/pointer focus), can be separately changed by user interaction as described herein.

In one or more implementations, there are several different interactions tools. A pointer tool, for example, allows user(s) to draw focus quickly and effectively to regions(s) of interest. This user/pointer focusing is visible among the users and makes navigating between different viewpoints straightforward. Changes to a scene can be limited, so that users can only interact with elements that are relevant to the shot design, and, for example, not accidentally change other elements. It should be noted that while certain tools are described herein, there is no limit on the type and/or number of interaction tools. Thus, the tools and figures shows herein are only non-limiting examples, and other tool(s) and operations (e.g., a measurement too) can be supported.

Figure 7:
FIGS. 7 and 8 are example representations of an interactive design-based layout comprising a scene view and a shot camera view that can be presented to a user of a production shot design system for interaction therewith, in accordance with various aspects and example implementations of the subject disclosure.

Turning to one example implementation, in one aspect the production shot design system can have two available views 770 and 772, as shown in FIG. 7. In this example, a top view comprises a scene view 770, and can be used to edit the scene. A bottom view comprises a camera view 772, which displays a view from a camera and is used to make the shot.

Figure 8:
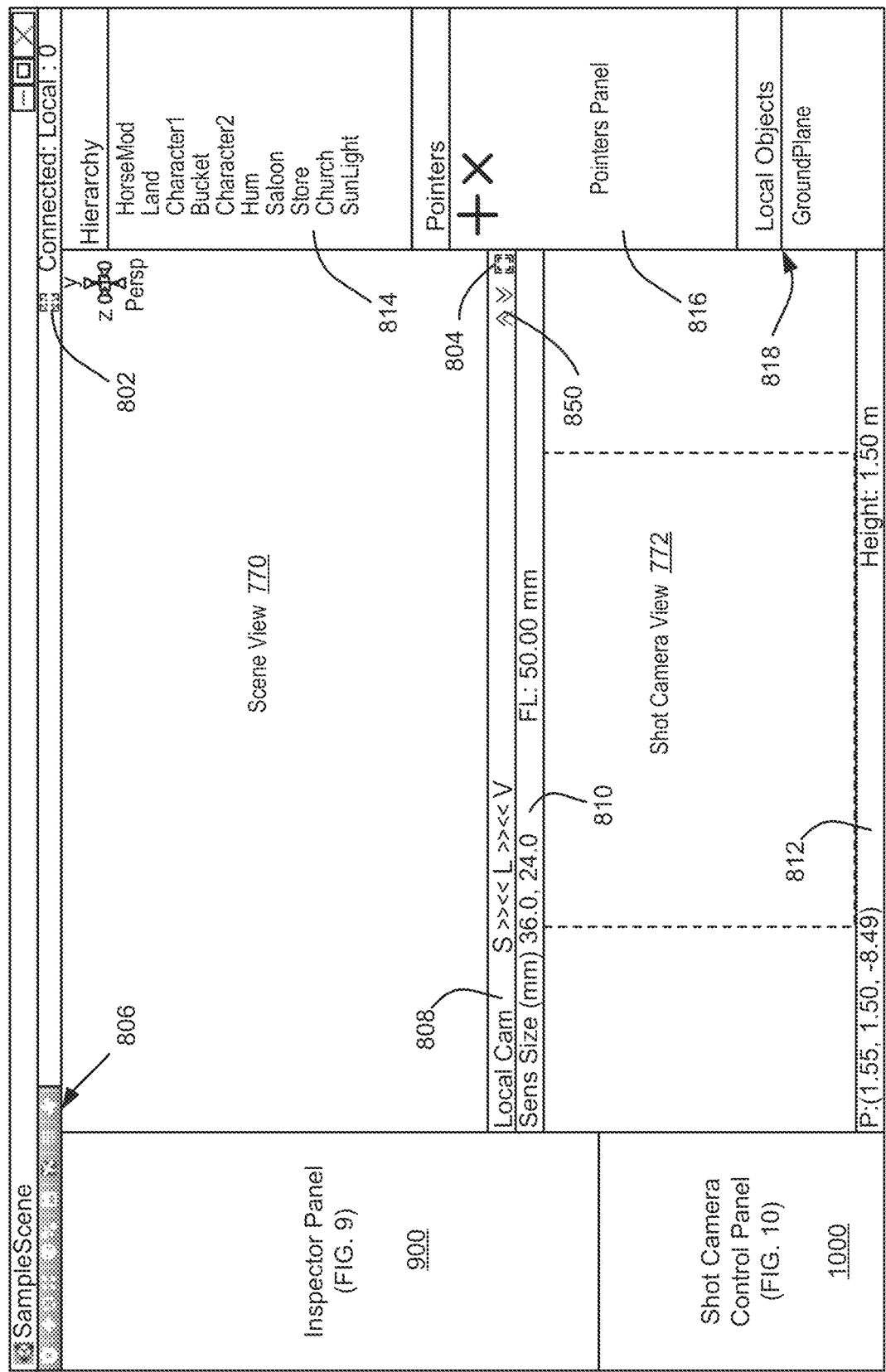

Various components depicted in FIG. 7 are labeled in FIG. 8, which has removed the screenshots for clarity in reading the numeric labels. For example, the scene view 770 or the camera view 772 can be maximized, e.g., by using the buttons labeled 802 and 804, respectively. A toolbar 806 provides efficient interactive button access, such as for selection and adjustments, including settings, move, rotate, scale, world transform, save, airplane mode, GroundPlane and custom UI.

The camera view is used to make the video shots. The camera view comprises separate cameras, including a local camera, a shared camera and a video plane camera. The local camera is local to the user and updates to the camera do not show up in the other clients' devices. The shared camera is a camera that is shared by the clients. With this camera, a user can make changes that are shown the all other clients. The video plane camera is per client, like the local camera but has an attached video plane. This plane is in front of the video plane camera and can be used to perform greenscreening of a video in the scene as described herein.

Figure 10:
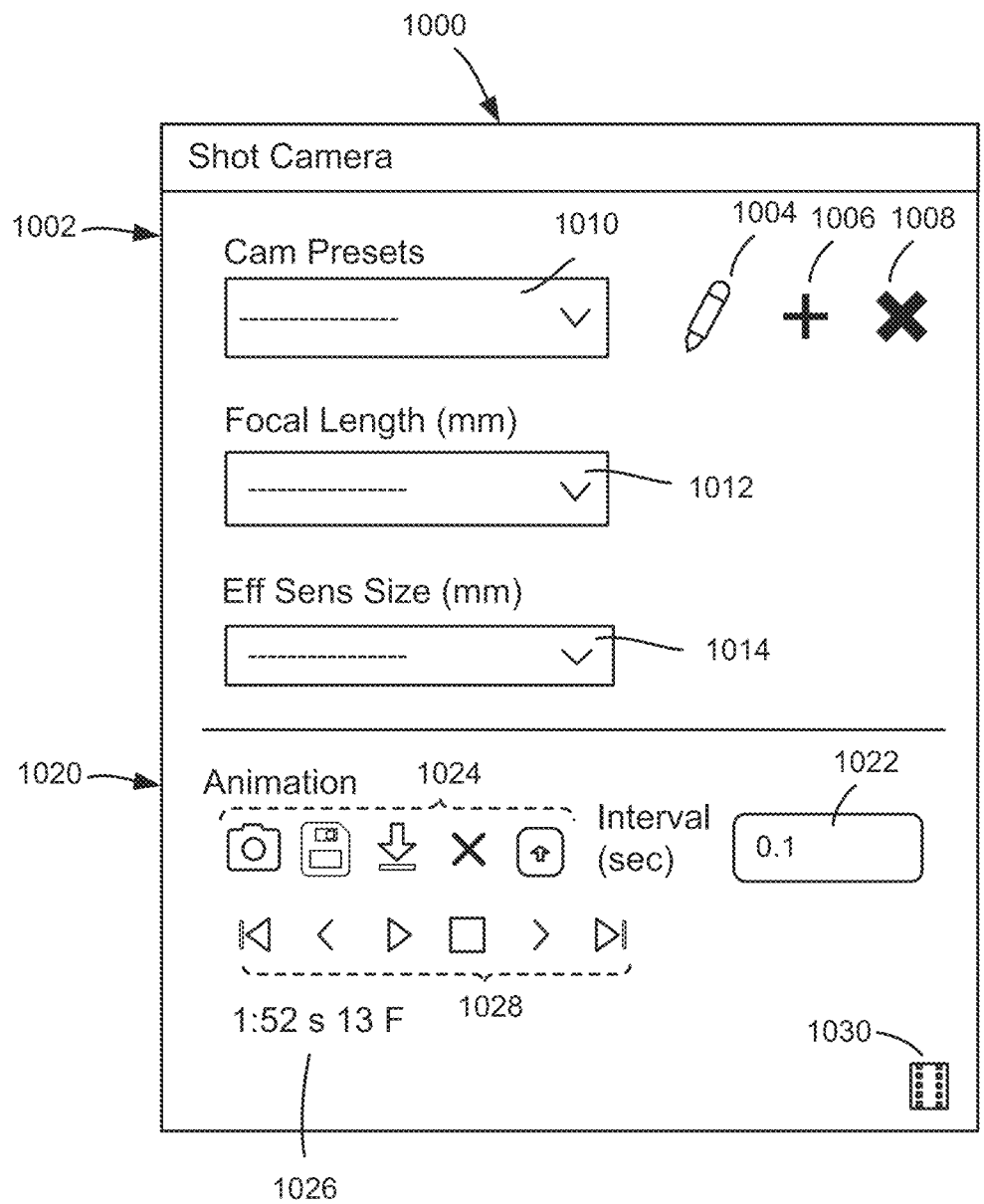
FIG. 10 is an example representation of interactive shot camera controls, in accordance with various aspects and example implementations of the subject disclosure.
Figure 11:
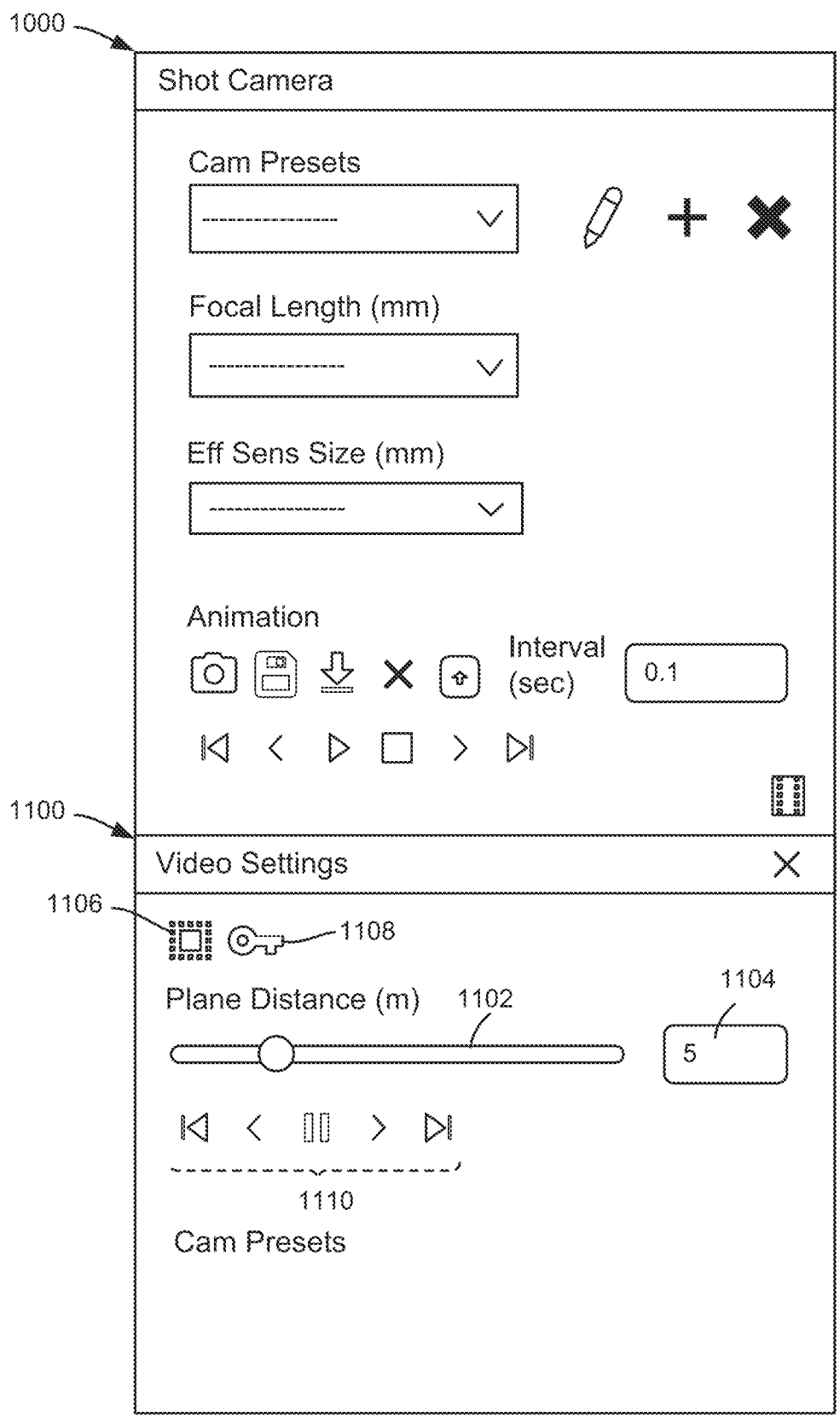
FIG. 11 is an example screenshot representation of interactive shot camera controls and video setting controls, in accordance with various aspects and example implementations of the subject disclosure.

The cameras have different states and properties and can be independently controlled. Control of the cameras is done by using a camera top bar 806 (FIG. 8) and the "Shot Camera" window (FIGS. 10 and 11). Shot camera movement can be performed via a first player shooter style controller via various keys or the like (depending on the input device), e.g., the shot camera can be moved left, right down with corresponding left and right arrow keys, forward and backwards with corresponding up and down arrow keys, and up and down along the Y-axis (e.g., with "Page Up" and "Page Down" keys, respectively). Camera rotation can be enabled by holding the right mouse button; mouse movement then performs and pan and tilt function.

The local camera and shared camera are selectable, e.g., by pressing the "L" button or the "S" button, respectively in the camera top bar 806. The video plane camera can be selected by pressing a similar button (e.g., the "V" button) in the camera top bar 806.

With respect to shot camera properties, properties can be updated from one camera to the other (synchronized) by pressing the "»" button (local-to-shared camera update) or the "«" button (shared-to-local camera update). The same applies to the video plane camera. Here the state can be copied between the local camera and the video plane camera.

State copy updates the various properties, including position and rotation, focal length, and effective sensor size (aspect ratio). The properties also can be updated between the current shot camera and the scene cam in the top window, by pressing one of the buttons 850 (scene camera to shot camera "down arrows" button or shot camera to scene camera "up arrows" button) in the camera top bar 808; note that only the position and rotation properties are updated.

To summarize, the shot camera view 772 has a local camera, a shared camera and a video plane camera, which are selectable in the camera top bar 808. The camera top bar 808 provides for camera synchronization, e.g., local-to-shared from local camera, shared-to-local from shared camera, and/or and similar camera synchronization options for the video plane camera. Note that this is only this is only one example implementation, and more camera options are feasible.

Camera information for the selected camera is available in the bars labeled 810 and 812, where Sens refers to sensor (effective sensor size), FL refers to focal length, and P refers to position (X, Y, Z). Camera height is also shown as described herein. Note that a reticle indicating the view of the physical camera can be provided, and which, for example, can be used to visibly indicate when the camera view window is not wide enough, and the like.

Figure 14:
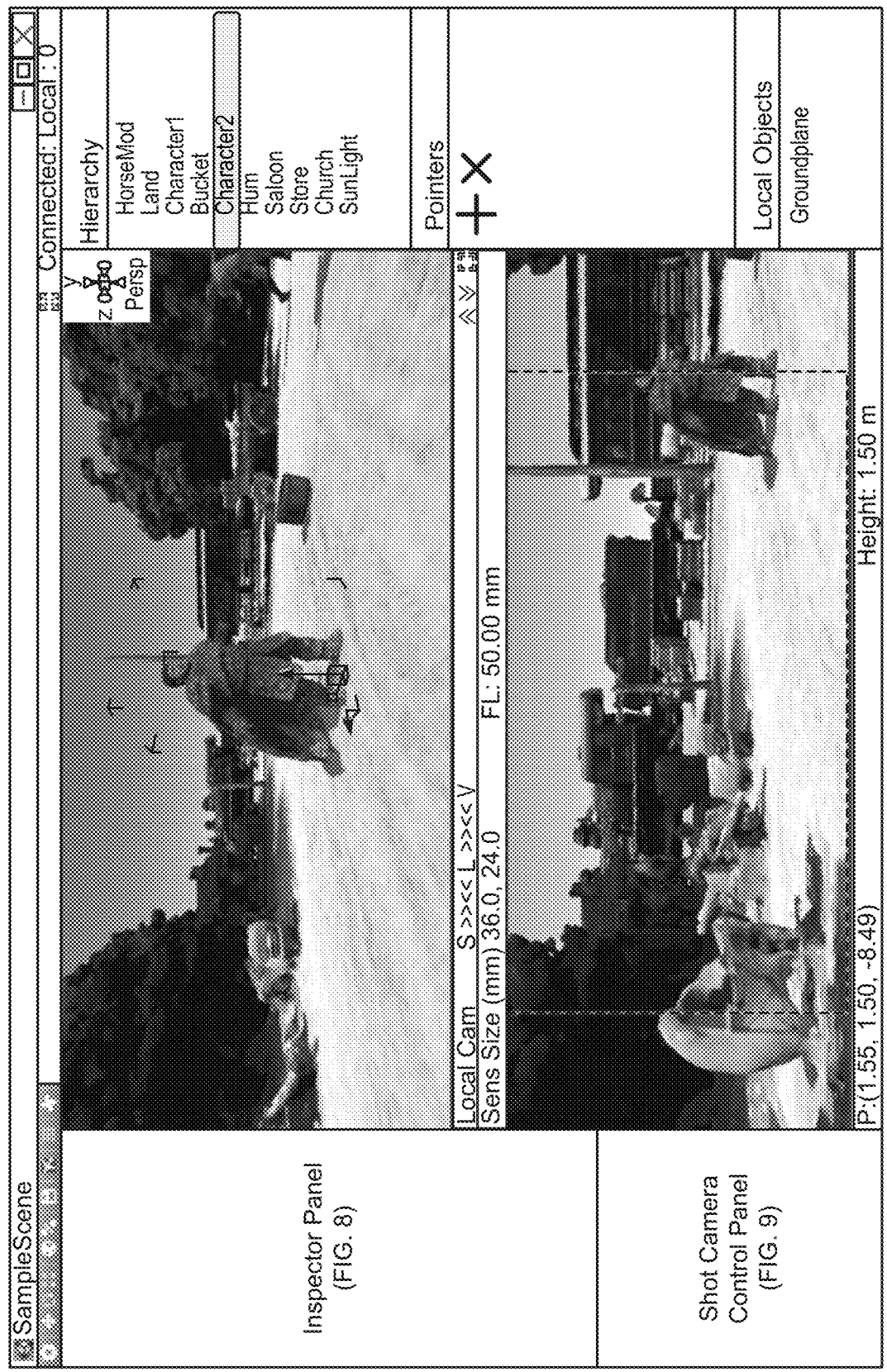
FIG. 14 is an example screenshot representation of object editing via interactive controls of a production shot design system, in accordance with various aspects and example implementations of the subject disclosure.

A changeable objects panel (window) 814 provides a hierarchy of objects that can be changed, e.g., via selection of an object as in FIG. 14. A pointers panel 816 lists any pointers.

A local objects panel 818 lists any local objects, e.g., GroundPlane. Note that the GroundPlane corresponds to a selectable tool, e.g., selected via the toolbar 806 (e.g., the next to last button on the right of the toolbar 806). In general, the GroundPlane tool is used for the measurement of the camera height, which is displayed in the camera view. When enabled via the toolbar button, the plane is visible. The height of the ground plane defines the "Zero" point for height, and in this example uses measured units in meters (m). The plane height can be changed, such as with interactive controls or in an inspector panel 900 by directly changing the y-value.

Figure 9:
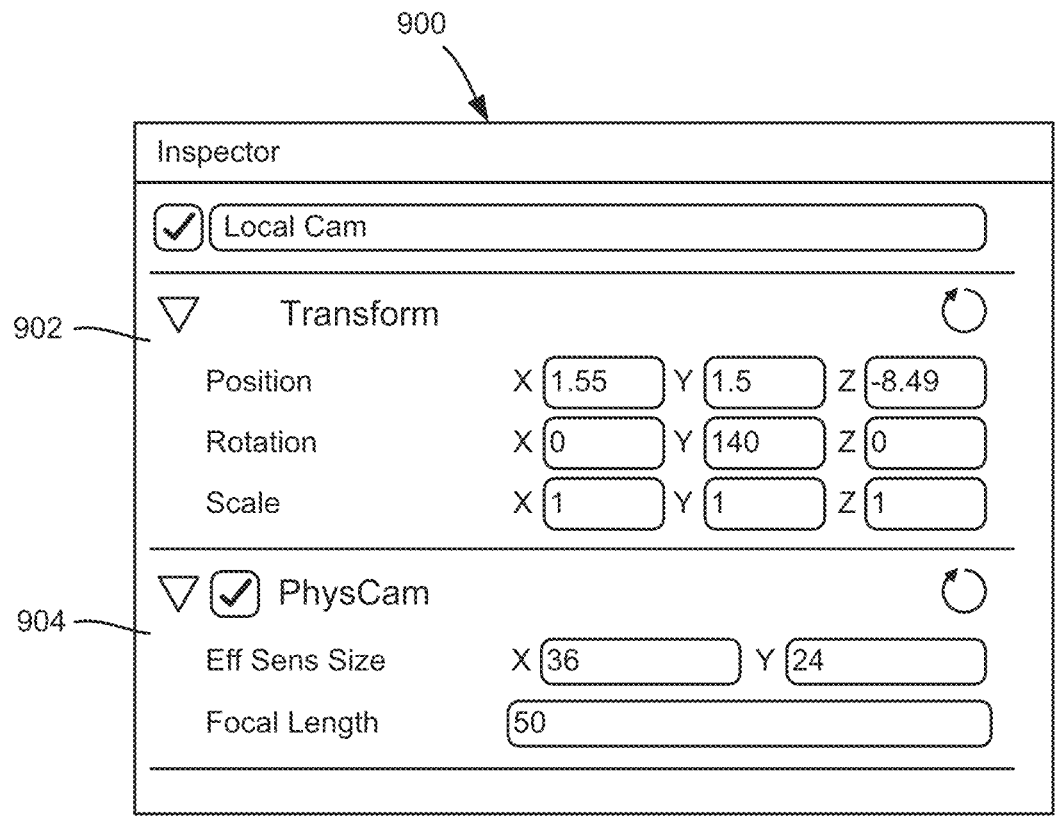
FIG. 9 is an example representation of interactive local camera and physical camera controls, in accordance with various aspects and example implementations of the subject disclosure.

More particularly, in an example implementation described herein, the inspector panel 900 provides a number of controls, as represented in FIG. 9. As can be seen, data for the selected local or shared camera (e.g., local camera) is shown, with transform controls for position, rotation and scale, each with respective X, Y and Z values that can be modified. Physical camera controls (for effective sensor size and focal length) are shown, which can be modified, e.g., via direct numeric data entry via the inspector panel 900. Note that in various scenarios as described herein, the inspector panel 900 can be enabled and disabled as needed to change the shot camera parameters. Note that a selected object's parameter can be similarly changed via the inspector panel 900 as described herein.

FIG. 10 shows example details of the shot camera control panel 1000. A top preset portion provides interactive controls for edit 1004, add 1006 and delete 1008. A shot camera preset control 1010, focal length control 1012 and effective sensor size control 1014 facilitate entry of the shot camera data.

More particularly, the properties of the currently active shot camera can be changed via the panel 1000, including to move and rotate shot camera to selected Cam Preset values (box 1010), to set the focal length of the shot camera (box 1012) and to set the effective sensor size (aspect ratio) of the shot camera (box 1014); for example, these are selected within a corresponding drop down menu. Selecting the entry will change the properties of the active shot camera.

The Cam Preset list can be edited with the "Edit", "Add" and "Delete" symbols (1004, 1006 and 1008, respectively). Note that "Edit" and "Add" takes the parameters from the local camera, not the shared camera, in order to prevent other users from changing the shared camera while editing the preset.

The Edit function selects the local camera and selects the Cam Preset, which can be edited via a DropDown. This also updates the local camera. Pressing the Edit button 1004 opens a PresetEdit menu; the shot camera movement tools can be used to change the position and rotation. The Preset name in the text field also can be changed during Edit, e.g., followed by pressing "Ok" to save the changes or "Cancel" to discard them.

The Add function works by selecting the local camera and using the shot camera movement tools to change the position and rotation as desired. Pressing the Add button 1106 allows for entering a name for the particular preset; an "Ok" button add the new entry, a "Cancel" button does not perform the add.

The Delete function (symbol 1008) deletes the currently selected entry in the DropDown 1010. A warning message can be provided to ask for confirmation, followed by pressing "Ok" to delete, or "Cancel" to keep the entry.

It is possible to lock certain preset entries, so that they cannot be edited or deleted. If a user attempts to change a locked entry, then a corresponding warning is presented, and no change is applied. Note that changes to the Cam Preset list are saved and are available also if ShotMaker is restarted.

The production shot design system allows recording and playback of shot camera animations. The controls are in the bottom part 1020 of the shot camera control panel 1000.

Shot camera animation is recorded or applied to the current shot camera. If the local camera, shared camera or video plane camera is selected, its animation can be recorded. For playback the currently selected shot camera is used, so that the animation can be played back for the local camera, shared camera or video plane camera. By way of example, a scenario is to record and review different animations locally with the local camera. Then a final animation can be played back with the shared camera so that other users can see the animation inserted into the scene.

Animation keyframes, with a keyframe sampling interval (in seconds) accessed via an interval input control 1022, record shot camera properties, including position and rotation, sensor size and focal length. In the example shot cameral control panel, buttons 1024, from left to right, correspond to record, save, load, delete and export operations.

The record operation records an animation of the current shot camera. The sampling interval is in the interval input control 1022, and can be changed by the user. Recording can be started and stopped by clicking on the camera symbol. Alternative input devices can be used, e.g., recording can be started and stopped by hitting a space bar keyboard key, a game controller button (e.g., Button B on an XBOX controller) and so forth.

An indication as to when recording is occurring can be output, e.g., a camera reticle turns red, the camera button turns into a recording symbol, and so forth. Current status information 1026 is displayed, e.g., recording time in seconds (s) and current keyframe number (F).

With respect to playback controls 1028, playback plays back the current active animation to the current active shot camera. The playback controls 1028 from left to right comprise go to begin of animation, go one keyframe back, play back the animation from the current position, stop and reset playback position, go one keyframe forwards, and go to the end of animation. During the playback interactions the status bar 1026 provides the time and frame information. Animation data is stored in memory and is the currently active animation.

The current active animation can be saved by clicking on the save button (second from left to right in the controls 1024), which, for example, can provide a dialog to enter animation (e.g., "take") information and a filename. If no current animation exists, a prompt can notify, and/or no action can be taken.

To load an animation from a file as the current active animation, a user can click on the load symbol, (the third from left to right in the set of controls 1024). A dialog can be used to present a list of existing animation files on disk. In one or more implementations, animation files can be .json files.

The fourth control button in the set of controls 1024 is a delete files button, which allows to deleting existing animation files from disk. When clicking on the delete button, a following dialog can be used to determine which file type the user wants to delete, e.g., animation Data (.json), video file (.mp4), and maya data (.animation). After the selection a dialog with a list of existing files, which are of the selected type (or possibly more than one type) is presented, whereby the file(s) can be deleted. Note that these files can be deleted or copied as with other file system files, such as with "Explorer" on WINDOWS or "Finder" on MAC PCs.

The animation export control (the rightmost in the set of controls 1024) allows exporting the current active animation into a different type. When clicking on the export button an interface (e.g., a pop-up window or the like) facilitates selecting the export type.

A "Video" type creates a video of the animation from begin to end. The entire ShotMaker window is captured, so that various data also can be seen in the video. The video export is frame based, so that the timing of the rendering and the compression does not affect the final video frame rate. A settings dialog provides different options for the exported video, e.g., an .mp4 file with H.264 encoding is created. During export, the status information 1026 line shows the time in seconds (s) of the current position and the current keyframe number (F).

The shot camera panel has an additional menu, namely a menu that provides access to video plane camera functionality. In the example of FIG. 10, a video panel control button 1030 allows selecting presenting a video plane camera menu 1100 (FIG. 11) in conjunction with the shot camera panel 1000.

More particularly, the example production shot design system has the ability to render a videoplane in the scene. The video source can be a file or a real time capture from a video capture card. The video is displayed on the plane and optionally greenscreening can be performed, so that pixels with the key color appear transparent. The video plane is in front of the video plane camera.

The distance of the video plane to the video plane camera can be adjusted with the slider bar 1102 or numeric input (box 1104). The size of the video plane is computed, such that it fits the view frustum of the video plane camera. From the video plane camera point of view, the video always fill the reticle, regardless how far away it is. The aspect ratio of the video plane is taken from the video source, whereby the video plane camera aspect ratio is set to the same ratio. In this way, the video plane can be placed anywhere in the scene. Note that the video plane is a scene element and is thus also is seen from the other cameras. This allows flexibility with the views.

Additional functions are accessed via the buttons/icons 1106 and 1108. Button 1106 enables/disables the video plane. Button 1108 enables/disables green screening. Video controls, e.g., for video playback from a file, are provided via the set of controls 1110. Other controls, not explicitly shown in FIG. 11, can be provided for video capturing from an external source.

Figure 12:
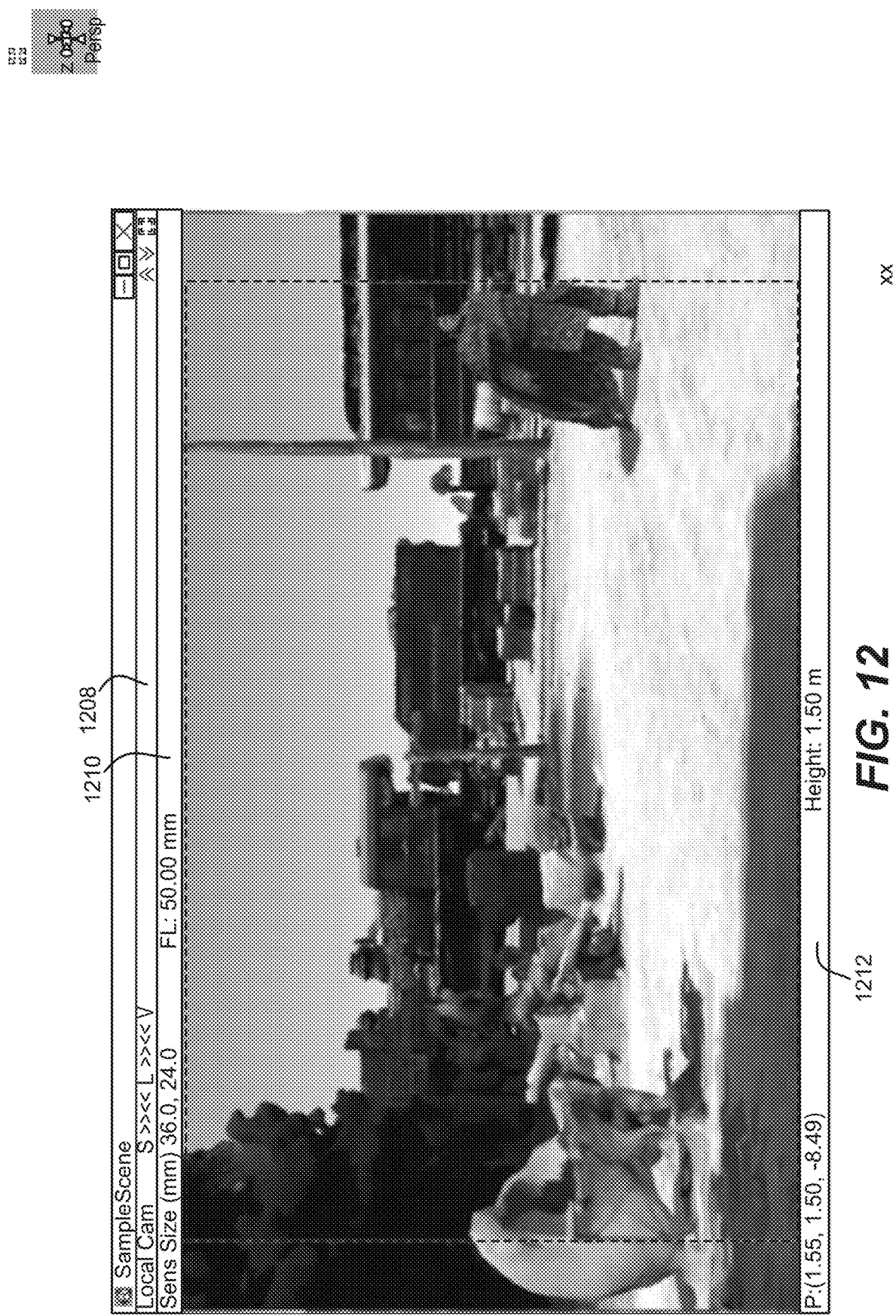
FIG. 12 is an example screenshot representation of an interactive enlarged shot camera view of a production shot design system, e.g., obtained via interaction with the interactive layout of FIGS. 7 and 8, in accordance with various aspects and example implementations of the subject disclosure.

An enlarged (e.g., maximized) camera view is shown in FIG. 12, e.g., obtained by clicking on button 804 in FIG. 8, corresponding to the shot camera view 772. Here the editing elements are removed, so that the user can watch the camera view in an enlarged (basically maximized) state. Shared, local and video plane camera selection can be performed via the bar 1208. The left inspector panel 900 (not explicitly shown in FIG. 12) can be enabled (and disabled) as needed to change the shot camera parameters, as displayed in the bars labeled 1210 and 1212.

Figure 13:
FIG. 13 is an example screenshot representation of an enlarged scene view of a production shot design system with interactive controls, e.g., obtained via interaction with the interactive layout of FIGS. 7 and 8, in accordance with various aspects and example implementations of the subject disclosure.

As represented in FIGS. 7 and 8, the scene view 770 is used to manipulate the scene. Actions can include, for example, moving objects, changing object properties and so forth. The scene view has a scene camera. An enlarged scene view, obtained for example via button 802 in FIG. 8, is shown in FIG. 13. Note that in the enlarged scene view of FIG. 13, the editing elements still exist, so that the scene can be manipulated as in FIG. 7 (and corresponding FIG. 8).

The scene view 770 corresponds to a scene camera; an orbit mode or a fly mode is provided, with selection via an assigned keyboard key (e.g., "G") when the scene view has been selected, or the "airplane" icon in the toolbar 806. To focus on an object in the scene view, the object can be selected (e.g., via pointer/focusing device, listed object name in the listed object panel 814, etc.) followed by pressing an assigned keyboard key (e.g., the "F" key).

The scene camera position and rotation can be changed in an orbit mode, with keyboard/controller/pointer buttons or wheels that change orbit, pan and zoom (move towards or from target) parameters. A fly (airplane) mode, such as controlled via a first person shooter-style controller, allows for moving left and right, moving forward and backward, and moving up and down along the y-axis. Camera rotation is provided, e.g., by a mouse button or the like, in which mouse movement result in performing a pan and tilt function. Note that a joystick can be used as a first person shooter-style controller.

Turning to selecting and editing scene objects, a scene object may be clicked on in the scene, or selected via the changeable objects (hierarchy) panel 814, as shown in FIG. 14. Note that similar selection works for cameras and pointers as well.

Once the object is selected, the object's parameters are shown in the inspector panel 900 (FIG. 9) whereby they can be changed. Note that not all objects may be selectable, only those that are editable in the scene.

To change a selected object's transform (position, rotation and scale), parameters in the inspector panel can be used. Handle tools (e.g., shown via the arrows and the like surrounding the selected character object in the upper part of FIG. 14) in the scene view also can be used, also corresponding to position, rotation and scale.

The current tool can be selected in the toolbar 806. When an object is selected, the current tool handle type is shown in the scene view, and the handles can be used to change the transform of the object. Also the current tool can be selected with the assigned keyboard keys, e.g., "M" is a Move tool, "R" is a Rotate tool and "S" is a Scale tool. By default, handles operate in "worldspace," which makes it easier to move objects. This can be toggled to local space by using the "Globe" button in the toolbar 806.

As set forth above, the online mode is used, when multiple users want to collaborate on a scene design. The mode is similar to the offline mode, however object locking and unlocking is provided, and shot information is saved locally.

In one aspect, to modify an object in the online mode, the object first has to be locked. This ensures that only one user can modify an object at a given time. Locking thus avoids the scenario where different users may want to modify the same object at the same time, after which it is unclear which modification is the ground truth.

To lock an object, the object is selected as described herein, with an assigned key or the like (e.g., the "L" key) pressed. If an object is selected, the selection box for the object in the scene changes color, e.g., to be either green or red. If it is green, then the object is unlocked, meaning no other user has locked the object and the object can be selected and locked. If the box is red, then another user has already locked the object and it cannot be locked. In that case, the objects and the camera panel show this object as locked, along with the other locking user's identity (e.g., user color data and name data).

To unlock a locked object, another (e.g., "U" key) can be pressed, e.g., by the user who locked the object or another authorized user. In one or more implementation, the locked object does not have to be selected for unlocking, as currently only one object can be locked at a given time.

When online, if the shot information is saved, then currently the save is performed locally. As a result, different users can save different shots.

A production shot design system can thus comprise client application instances that render a representation of a scene, and communicate scene change information from a first client application instance to at least one other client application instance. The scene change information can comprise scene object change information (e.g., placement or other information), scene object property change information, camera-related information and/or animation-related information.

In one or more implementations, the production shot design system can provide for limiting the changes to the scene a user can make. This is provided so that erroneous user input cannot modify protected scene elements. To this end, the production shot design system allows specifying which scene objects can be modified, and which cannot be modified. This can be by data associated with the scene file in use, and/or as part of the ground truth data maintained at the authoritative client. For example, a scene object can be specifically locked such that no user can obtain the lock; (unless, for example, a specific procedure at the authoritative client is performed to unlock that otherwise non-modifiable scene object). It is also feasible to make some, but not all properties of a scene object non-modifiable; for example, the shape property of an object can be non-modifiable, but the color property of that object can be modifiable.

For modifiable scene objects, if a user/client wants to make a change to the scene in the online mode, the user first has to get access to a scene object and lock it to that user, as only one user at a time can modify a given object. For example, in addition to specific locking of non-modifiable scene objects, a different user can have an object locked. Some communication with that different user (e.g., verbal over an audio connection, via a prompt ("user X would like to gain access to object Y, which you, user Z, currently have locked") and so forth can be used to get a modifiable scene object unlocked. A timer also can be used, such that if a connection to one user is lost, a locked scene object by that one user automatically becomes unlocked after a period of time. An authority (e.g., a user at the authoritative client) can also unlock a locked object. A "read-only" type property attribute can be preset for a non-modifiable property value, for example.

Changes to the scene are communicated to the other clients, e.g., virtually immediately, so that each client will display the change for users to see at an interactive frame rate.

In one aspect, the scene update does not transfer any sensitive data, whereby no sensitive (secret) data is transferred over the network. This makes the solution very safe. Instead, the sensitive data (e.g. 3D scene files) only exist on the clients, with only update information (e.g., the scene update data) relative to a scene file transferred. Notwithstanding, alternative implementations can allow the transfer of sensitive data from dedicated resources to the clients; if so, such a transfer can be encrypted so that sensitive data is well protected.

In general, the application is designed for production (e.g., movie) shot making, including providing straightforward usage via an interface specifically to meet production needs. The technology facilitates remote (e.g., worldwide) collaboration, by allowing multiple users anywhere in the world to create a shot interactively by modifying elements in the scene. Generally, each user can modify the scene elements, and changes are immediately visible to the users.

At the same time, the application is highly secure in that no sensitive content needs to be transferred over the network.

The application further provides a controlled editing environment that can restrict scene editing to only select parts of the scene, e.g., to avoid catastrophic errors during production and/or editing. The application provides for the usage of physically accurate assets (e.g., accurate size), physical based cameras in which application cameras behave like or even identical to physical cameras used for production.

Further, editing happens in 3D space; no 2D drawings or images are needed, although for example, they can supplement the system (e.g., a geographical map where a scene takes place). Assets can be reused for other parts of the previsualization and rendering pipeline. For example, common asset file formats can be used to allow the exchange of 3D models with other parts of a production pipeline.

The following describes some interactive processes and operations in one or more example implementations:

---

Keyboard Shortcuts
    Key Function (offline and online)
        F—Focus on selected object in scene view
        G—Toggle FlyMode mode in scene view
        M—Move tool
        R—Rotate tool
        S—Scale tool
        <SPACE> Toggle shot camera animation recording
    Online mode (online only):
        L Lock Object
        U Unlock Object
        <ESC> Session window
Scene Camera Movement
    Orbit Mode:
        <ALT> (<Cmd> on MAC) + Left Mouse Button: Orbit
        <ALT> (<Cmd> on MAC) + Right Mouse Button: Pan
        Mouse Scrollwheel: Zoom (Move towards or from target)
    FlyMode (First person shooter) style control:
        "Arrow Left" - "Arrow Right" - Move Left and Right
        "Arrow Up" - "Arrow Down" - Move forwards and backwards
        "Page Up" - "Page Down" - Move up and down along Y-axis
    Camera rotation
        Camera rotation is enabled by holding the right mouse button. The mouse movement then performs and pan and tilt function.
Shot Camera Movement (First person shooter) style control:
    "Arrow Left" - "Arrow Right" - Move Left and Right
    "Arrow Up" - "Arrow Down" - Move forwards and backwards
    "Page Up" - "Page Down" - Move up and down along Y-axis
Camera rotation
    Camera rotation is enabled by holding the right mouse button. The mouse movement then performs and pan and tilt function.

---

Figure 15:
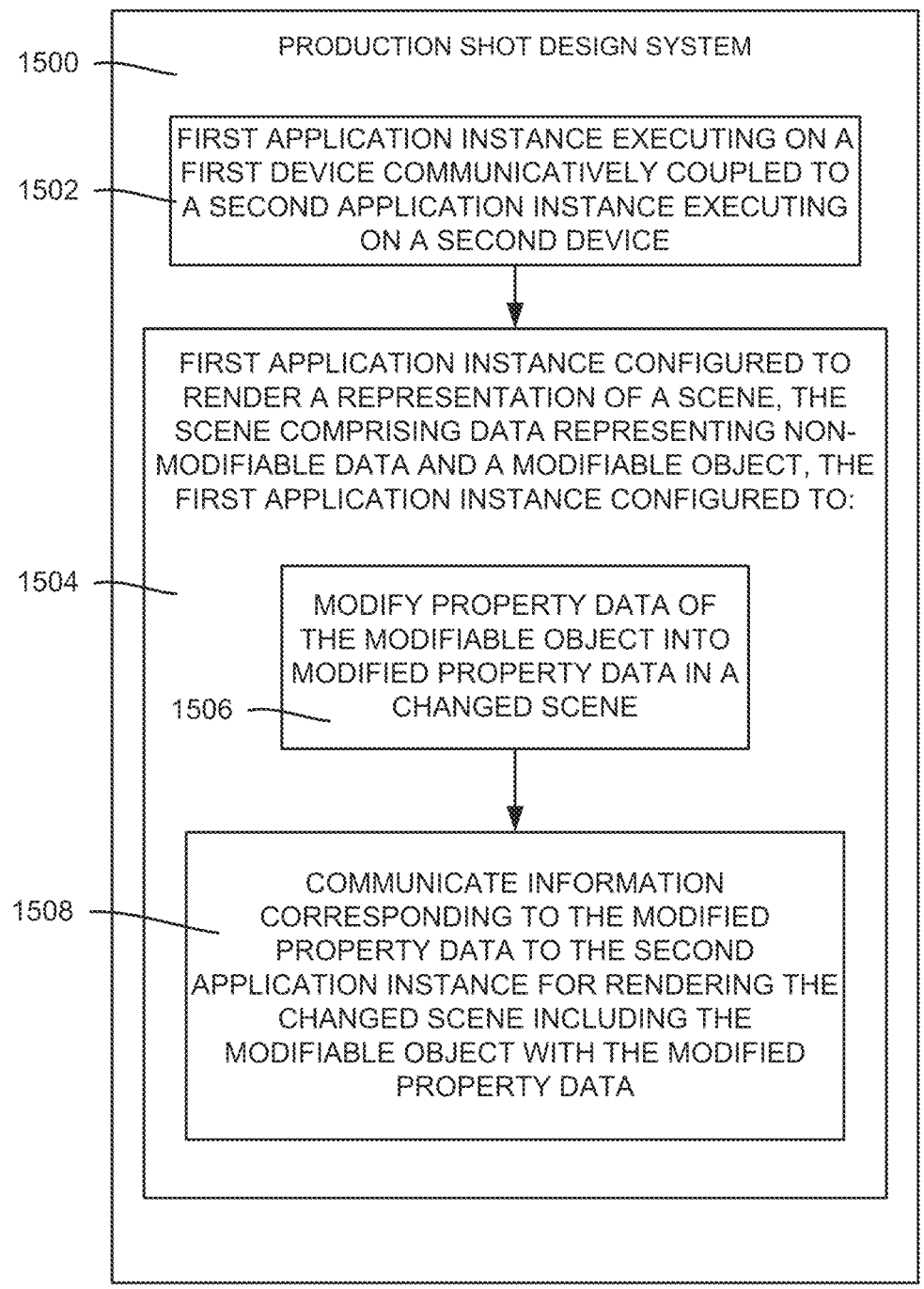
FIG. 15 is a block diagram showing example aspects of a production shot design system, in accordance with various aspects and example implementations of the subject disclosure

One or more aspects can be embodied in a production shot design system 1500, such as represented in FIG. 15. Example component 1502 represents a first application instance executing on a first device communicatively coupled to a second application instance executing on a second device. As represented by block 1504, the first application instance is configured to render a representation of a scene, the scene comprising data representing non-modifiable data and a modifiable object. As represented by blocks 1506 and 1508, respectively, the first application instance is configured to modify property data of the modifiable object into modified property data in a changed scene, and communicate information corresponding to the modified property data to the second application instance for rendering the changed scene including the modifiable object with the modified property data.

The first application instance can be configured to render a scene view comprising controls for manipulating the scene into the changed scene, and a camera view for viewing the scene and the changed scene.

The first application instance can be associated with selectable cameras comprising a local camera, shared camera and video plane camera, and the first application instance can be configured to communicate the information corresponding to the modified property data based on user selection of the shared camera. The first application instance can be further configured to modify local camera property data associated with the local camera and to modify shared camera property data associated with the shared camera.

The first application instance can be associated with selectable cameras comprising a video plane camera that provides a videoplane in the scene. The first application instance can be configured to lock the modifiable object from modification by the second application instance. The first application instance can be further configured to insert animation data into in the scene. The first application instance can comprises a shot camera that records animation data.

Figure 16:
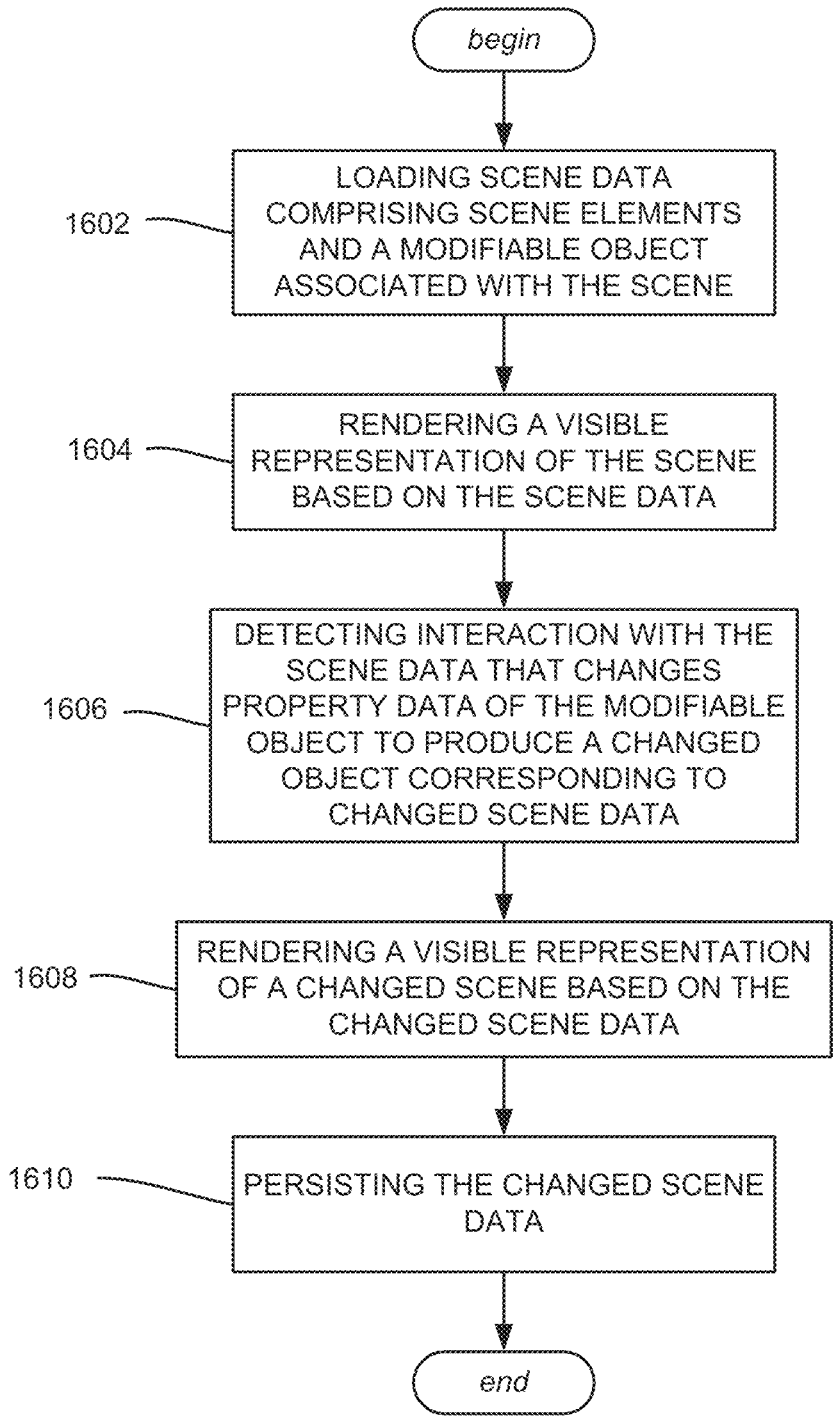
FIGS. 16 and 17 are flow diagrams of example operations that may be performed with respect to a production shot design system, in accordance with various aspects and example implementations of the subject disclosure.

One or more example aspects, such as corresponding to operations of a method, are represented in FIG. 16. Operation 1602 represents loading scene data comprising scene elements and a modifiable object associated with the scene. Operation 1604 represents rendering a visible representation of the scene based on the scene data. Operation 1606 represents detecting interaction with the scene data that changes property data of the modifiable object to produce a changed object corresponding to changed scene data. Operation 1608 represents rendering a visible representation of a changed scene based on the changed scene data. Operation 1610 represents persisting the changed scene data.

Aspects can comprise communicating information corresponding to the changed object to a remote device. Aspects can comprise locking the modifiable object to prevent modification to the property data of the modifiable object by the remote device.

The modifiable object can comprise a camera, and the detecting the interaction with the scene data that changes the property data of the modifiable object can comprise detecting a camera parameter data change. Detecting the camera parameter data change can comprise detecting a change to at least one of: sensor size data, focal length data, position data, or height data.

The modifiable object can comprise a scene element, and detecting the interaction with the scene data that changes the property data of the modifiable object can comprise detecting a scene element parameter data change. Detecting the scene element parameter data change can comprise detecting at least one: of position data, rotation data or scale data.

Loading the scene data can be performed by a first application instance, and aspects can comprise running the application instance in an offline mode at a first time, and running the application instance in an online mode at a second time; the online mode can correspond to coupling the application instance for communication with a second application instance.

Figure 17:
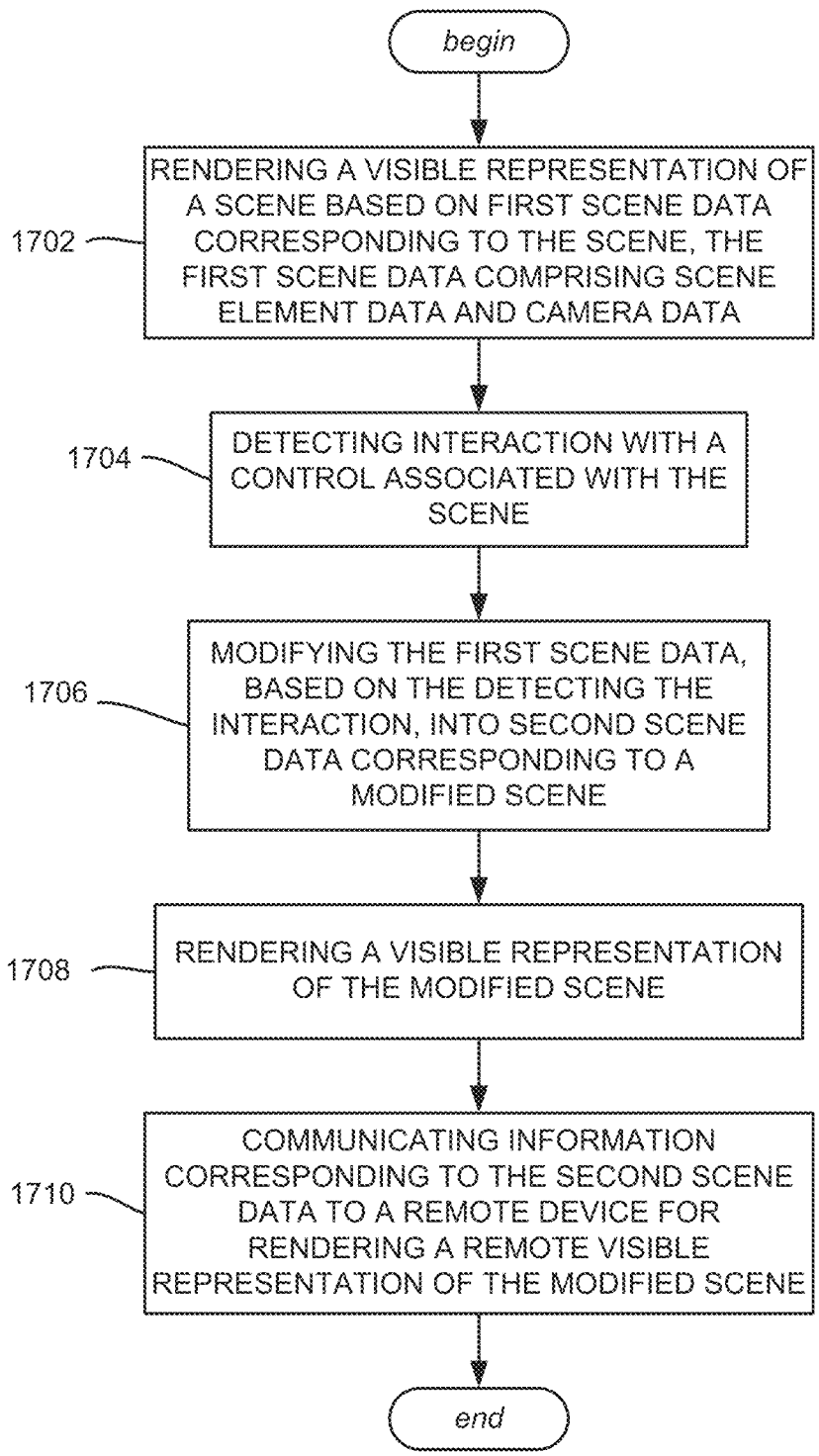

FIG. 17 summarizes various example operations, e.g., corresponding to executable instructions of a machine-readable storage medium, in which the executable instructions, when executed by a processor, facilitate performance of the example operations. Operation 1702 represents rendering a visible representation of a scene based on first scene data corresponding to the scene, the first scene data comprising scene element data and camera data. Operation 1704 represents detecting interaction with a control associated with the scene. Operation 1706 represents modifying the first scene data, based on the detecting the interaction, into second scene data corresponding to a modified scene. Operation 1708 represents rendering a visible representation of the modified scene. Operation 1710 represents communicating information corresponding to the second scene data to a remote device for rendering a remote visible representation of the modified scene.

Detecting the interaction with the control can comprise detecting user interaction with a scene element property data control, and wherein the modifying the first scene data, based on the detecting the interaction, into the second scene data comprises modifying scene element property data of a currently selected scene element.

Detecting the interaction with the control can comprise detecting user interaction with a camera parameter data control, and wherein the modifying the first scene data, based on the detecting the interaction, into the second scene data comprises modifying camera parameter data of a currently selected camera.

The modified scene can be a first modified scene, and further operations can comprise inserting an animation into the first modified scene to modify the first modified scene into a second modified scene.

As can be seen, there is described a technology that provides an interactive 3D shot design system that is secure. The technology facilitates worldwide collaboration, while providing any functions of scene delivery.

Figure 18:
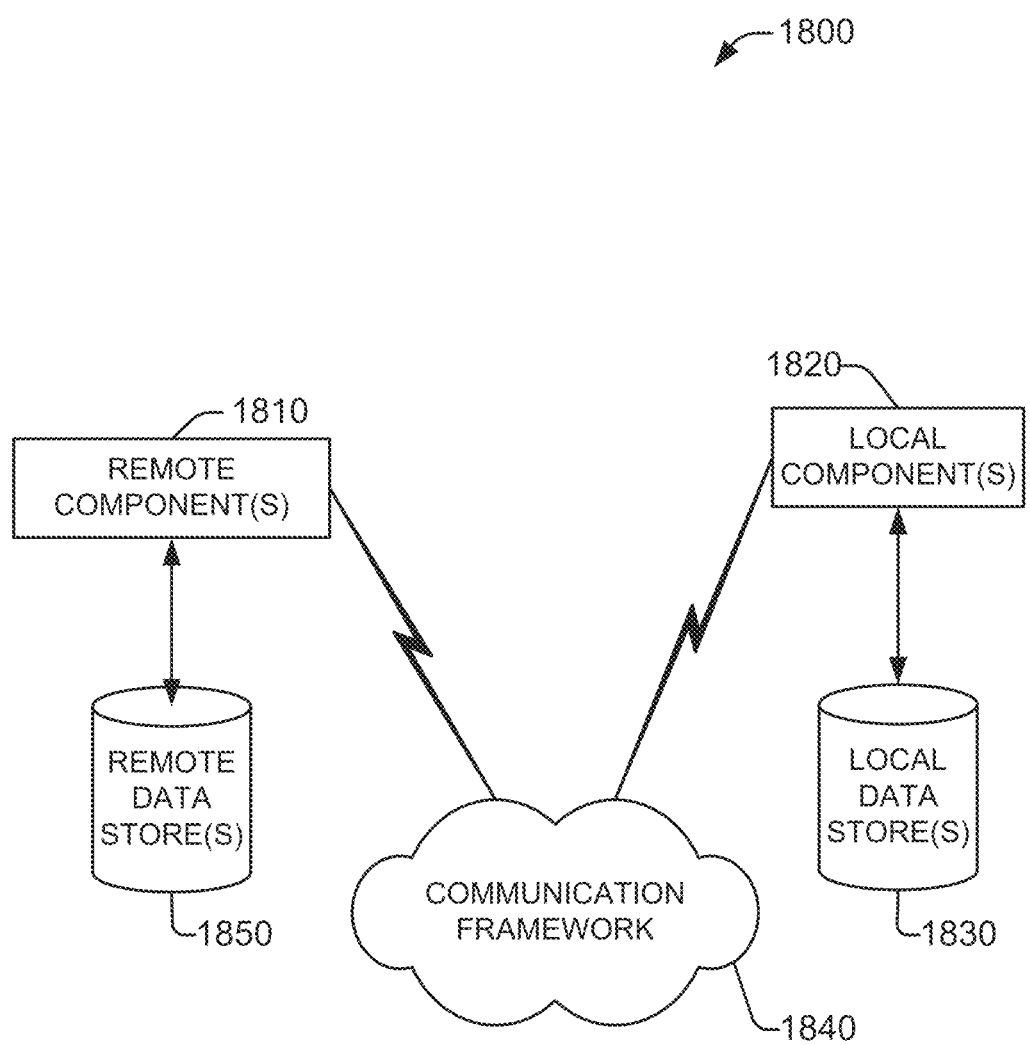
FIG. 18 is a block diagram representing an example computing environment into which aspects of the subject matter described herein may be incorporated.

FIG. 18 is a schematic block diagram of a computing environment 1800 with which the disclosed subject matter can interact. The system 1800 comprises one or more remote component(s) 1810. The remote component(s) 1810 can be hardware and/or software (e.g., threads, processes, computing devices). In some embodiments, remote component(s) 1810 can be a distributed computer system, connected to a local automatic scaling component and/or programs that use the resources of a distributed computer system, via communication framework 1840. Communication framework 1840 can comprise wired network devices, wireless network devices, mobile devices, wearable devices, radio access network devices, gateway devices, femtocell devices, servers, etc.

The system 1800 also comprises one or more local component(s) 1820. The local component(s) 1820 can be hardware and/or software (e.g., threads, processes, computing devices). In some embodiments, local component(s) 1820 can comprise an automatic scaling component and/or programs that communicate/use the remote resources 1810 and 1820, etc., connected to a remotely located distributed computing system via communication framework 1840.

One possible communication between a remote component(s) 1810 and a local component(s) 1820 can be in the form of a data packet adapted to be transmitted between two or more computer processes. Another possible communication between a remote component(s) 1810 and a local component(s) 1820 can be in the form of circuit-switched data adapted to be transmitted between two or more computer processes in radio time slots. The system 1800 comprises a communication framework 1840 that can be employed to facilitate communications between the remote component(s) 1810 and the local component(s) 1820, and can comprise an air interface, e.g., Uu interface of a UMTS network, via a long-term evolution (LTE) network, etc. Remote component(s) 1810 can be operably connected to one or more remote data store(s) 1850, such as a hard drive, solid state drive, SIM card, device memory, etc., that can be employed to store information on the remote component(s) 1810 side of communication framework 1840. Similarly, local component(s) 1820 can be operably connected to one or more local data store(s) 1830, that can be employed to store information on the local component(s) 1820 side of communication framework 1840.

Figure 19:
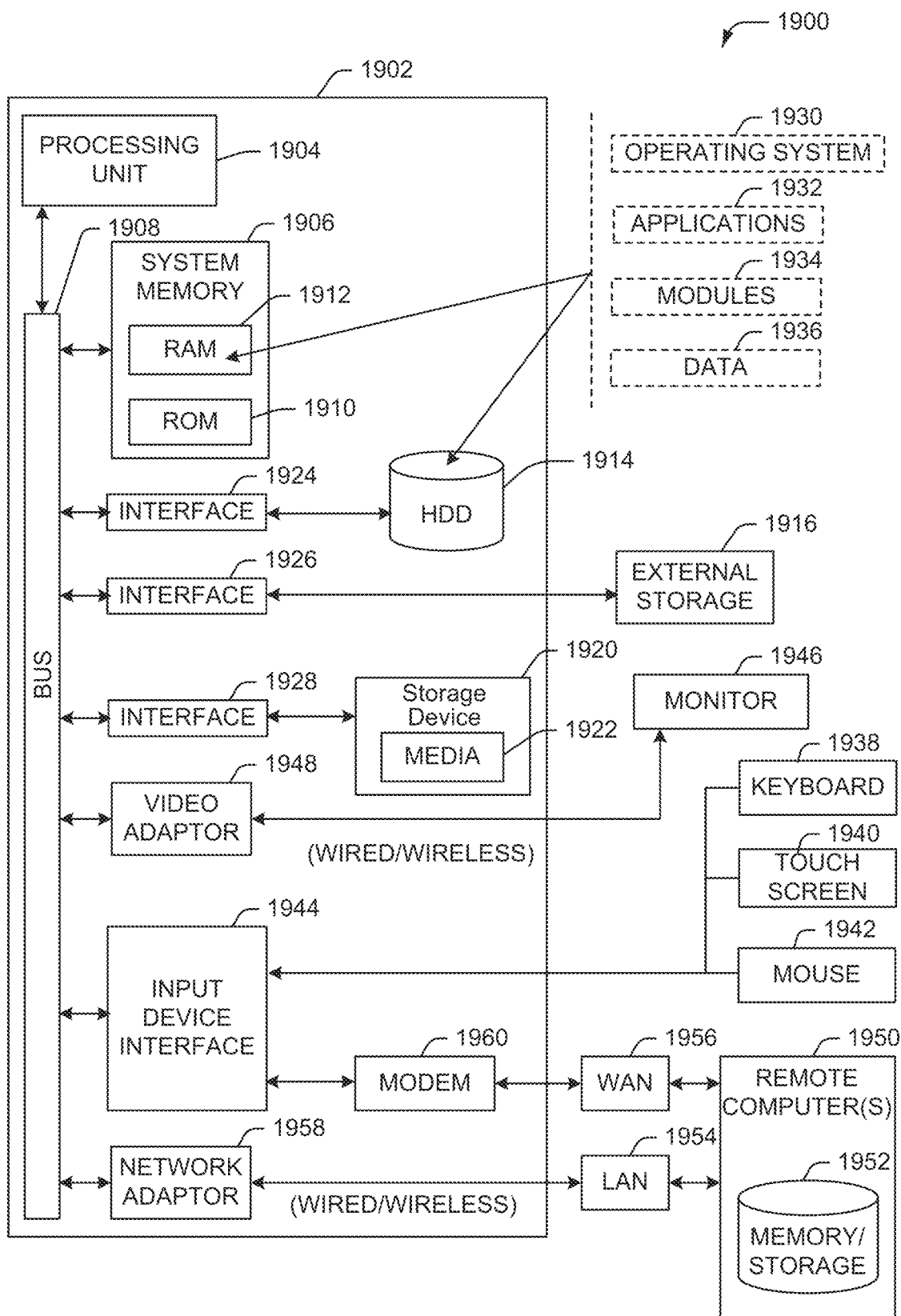
FIG. 19 depicts an example schematic block diagram of a computing environment with which the disclosed subject matter can interact, in accordance with various aspects and implementations of the subject disclosure.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (loT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), and can include one or more external storage devices 1916 (e.g., a magnetic floppy disk drive (FDD) 1916, a memory stick or flash drive reader, a memory card reader, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914.

Other internal or external storage can include at least one other storage device 1920 with storage media 1922 (e.g., a solid state storage device, a nonvolatile memory device, and/or an optical disk drive that can read or write from removable media such as a CD-ROM disc, a DVD, a BD, etc.). The external storage 1916 can be facilitated by a network virtual machine. The HDD 1914, external storage device(s) 1916 and storage device (e.g., drive) 1920 can be connected to the system bus 1908 by an HDD interface 1924, an external storage interface 1926 and a drive interface 1928, respectively.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
    a processor; and
    a memory that stores executable instructions that, when executed by the processor of the system, facilitate performance of operations, the operations comprising:
        receiving, at an authoritative entity that is authorized to commit changes to a scene, scene change data from a client program instance that is not authorized to commit changes to the scene;
        committing, by the authoritative entity, a scene change to the scene based on the scene change data, to a storage device that maintains a ground truth state of the scene.

2. The system of claim 1, wherein the operations further comprise rendering, on a display device coupled to the authoritative entity, a visible representation of the scene based on the scene data.

3. The system of claim 1, wherein the scene change data changes property data of a modifiable object to produce a changed object corresponding to the changed scene data.

4. The system of claim 1, wherein the scene change data changes parameter data of a camera to produce a changed camera view corresponding to the changed scene data.

5. The system of claim 1, wherein the operations further comprise locking an object in the scene from modification by the non-authoritative entity.

6. The system of claim 1, wherein the authoritative entity comprises an authoritative client program running on a machine, wherein the machine comprises the storage device or is coupled to the storage device.

7. The system of claim 1, wherein the client program instance is a first client program instance, wherein the authoritative entity comprises a second client program instance, and wherein the first client program instance is communicatively coupled to the second client program instance via a server.

8. The system of claim 7, wherein the server runs on a machine on which the second client program instance is running.

9. The system of claim 1, wherein the scene change data is first scene change data, and wherein the operations further comprise receiving, at the authoritative entity, second scene change data from the client program instance, and rendering a representation of the scene based on the second scene change data without committing another scene change to the scene based on the second scene change data.

10. The system of claim 1, wherein the client program instance is a first client program instance, wherein the scene change data is first scene change data, and wherein the operations further comprise receiving, at the authoritative entity, second scene change data from a second client program instance, and rendering a representation of the scene based on the second scene change data without committing another scene change to the scene based on the second scene change data.

11. The system of claim 1, wherein the client program instance is a first client program instance, wherein the scene change data is first scene change data, and wherein the operations further comprise receiving, at the authoritative entity, second scene change data from a second client program instance, rendering a representation of an updated scene based on the second scene change data, and committing, by the authoritative entity, an updated scene change to the scene based on the second scene change data.

12. A method, comprising:
  detecting, on a device comprising a processor, interaction with an application program instance running on the device, the interaction causing a change to property data of a modifiable object of a scene rendered on a display coupled to the device, to produce a changed object;
  rendering, by the device, a visible representation of a changed scene comprising the changed object, wherein the application program instance is incapable of committing the changed scene to a ground truth scene state; and
  sending, by the device, changed scene data based on the changed object to an authoritative entity capable of committing the changed scene to a ground truth scene state.

13. The method of claim 12, wherein the modifiable object comprises a camera, and wherein the detecting the interaction comprises detecting a change to parameter data of the camera.

14. The method of claim 13, further comprising changing, based on the detecting the interaction, at least one of: sensor size data of the camera, focal length data of the camera, position data of the camera, or height data of the camera.

15. The method of claim 12, wherein the modifiable object comprises a scene element, and wherein the detecting the interaction comprises detecting a parameter data change to the scene element.

16. The method of claim 15, further comprising changing, based on the detecting the interaction, at least one of: position data of the scene element, rotation data of the scene element, or scale data of the scene element.

17. A machine-readable storage medium, comprising executable instructions that, when executed by a processor, facilitate performance of operations, the operations comprising:
  receiving, at an authoritative entity that is authorized to commit changes to a scene, scene change data from a non-authoritative client program that is not authorized to commit changes to the scene;
  rendering a representation of a modified scene corresponding to the scene as modified by the scene change data;
  maintaining scene information corresponding to modified scene in a scene data structure; and
  deciding whether to commit the scene information, and in response to deciding to commit the scene information, committing the scene information to a storage device that maintains a ground truth state of the scene.

18. The machine-readable storage medium of claim 17, wherein the receiving the scene change data comprises receiving an animation that changes the scene to the modified scene.

19. The machine-readable storage medium of claim 17, wherein the operations further comprise locking an object in the scene from modification of at least part of parameter data of the object.

20. The machine-readable storage medium of claim 17, wherein the receiving the scene change data comprises receiving at least one of camera change data or object change data.

* * * * *